Oct. 9, 1956  J. BERANEK  2,765,521
COMMUTATOR ASSEMBLY DEVICE
Filed Jan. 2, 1952  2 Sheets-Sheet 1

Inventor:
James Beranek
By: Alonzo B. Kight
Atty.

Oct. 9, 1956                    J. BERANEK                    2,765,521
                        COMMUTATOR ASSEMBLY DEVICE
Filed Jan. 2, 1952                                          2 Sheets-Sheet 2
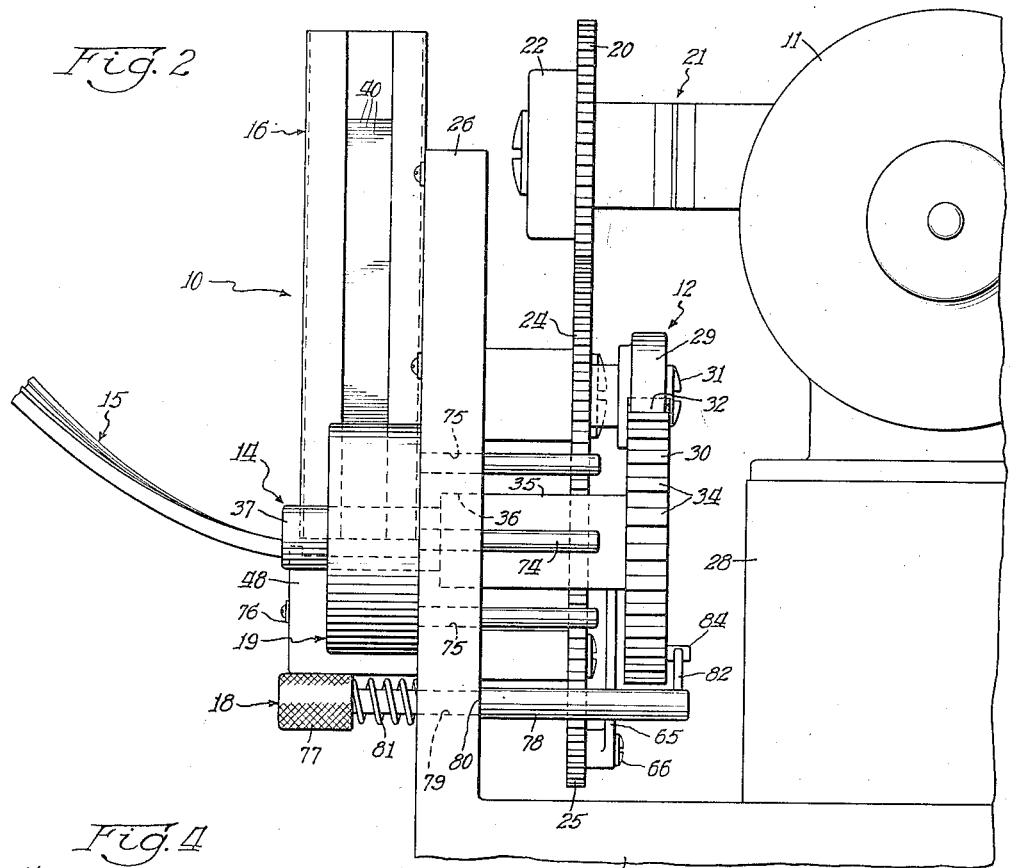
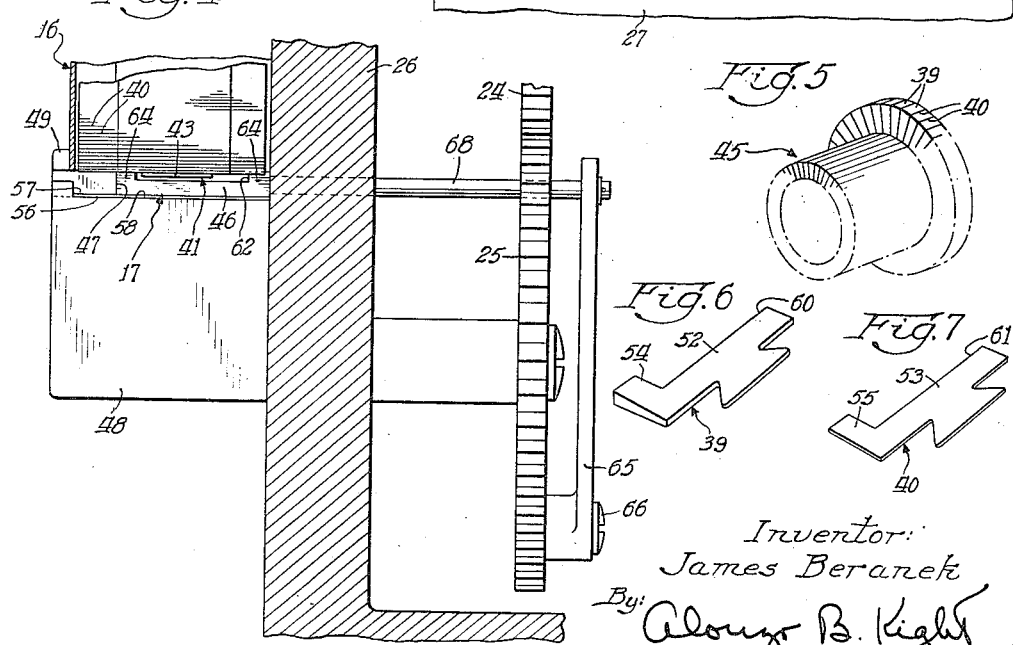
Inventor:
James Beranek
By: Alonzo B. Kight
          Atty.

United States Patent Office 2,765,521
Patented Oct. 9, 1956

2,765,521

COMMUTATOR ASSEMBLY DEVICE

James Beranek, Newburg Heights, Ohio, assignor to Borg-Warner Corporation, Chicago, Ill., a corporation of Illinois Application January 2, 1952, Serial No. 264,410

1 Claim. (Cl. 29—205)

This invention relates to a device for assembling a plurality of segments into a generally cylindrical configuration, and more particularly the invention relates to a machine for automatically alternately stacking electrical conducting and insulating segments of a commutator for an electric motor, generator, or the like.

The assembly of alternate conducting and insulating segments of electric motor commutators has ordinarily been accomplished by hand because of the complexity of most automatic assembling machines. By manual assembly, an experienced assembler can average approximately 25 commutators per hour.

The automatic assembly device of the present invention provides a very much simplified machine for assembling the segments of a commutator very rapidly and efficiently. The automatic commutator assembly machine is simple and inexpensive to construct and to operate. By the use of the machine, the assembly of the commutator segments is greatly speeded up so that approximately 200 ordinary commutators can be assembled per hour. Hence, the labor cost of each commutator is substantially reduced.

It is an object of the present invention to provide an improved power driven device for assembling a plurality of elements into a substantially cylindrical configuration.

Another object of the invention is to provide an improved machine for assembling the alternate conducting and insulating segments of an electric motor commutator or the like.

A further object of the invention is to provide a very simple assembly mechanism for successively assembling pairs of conducting and insulating segments into a substantially cylindrical configuration of alternate conducting and insulating segments.

Still another object of the present invention is to provide simplified segment engaging means in a commutator assembly device for successively feeding pairs of segments into an assembly cavity.

The commutator assembly device according to this invention includes drive means for driving an indexing mechanism and a slide feed mechanism in timed relation together with means for supplying conducting segments and insulating segments to the device for formation of an electric motor commutator or the like. The slide feed mechanism is constructed so that one conducting segment and one insulating segment are stacked with each forward movement of the slide with the stack being inserted into an assembly cavity against a hub driven by the indexing mechanism. As the slide mechanism retracts, the indexing mechanism rotates the hub into position for receiving the next stack or pair of segments. Stop means are provided for automatically stopping the machine after each commutator has been completely assembled. In addition, means are provided for ejecting an assembled commutator to place the machine in condition for assembling another commutator.

Other objects, features and advantages of the present invention will be apparent from the following detailed description of one embodiment, by way of preferred example only, taken in conjunction with the accompanying drawings, in which:

Fig. 2 is an end elevational view of the commutator assembly device shown in Fig. 1;

Fig. 4 is an enlarged fragmentary sectional view taken along line 4—4 of Fig. 1 and showing the slide mechanism in further detail;

Fig. 5 is a perspective view of an assembled commutator of the type assembled by the machine of the present invention;

Fig. 6 is a perspective view of a conducting segment of a commutator as shown in Fig. 5; and Fig. 7 is a perspective view of a nonconducting segment of a commutator such as shown in Fig. 5.

Figure 1:
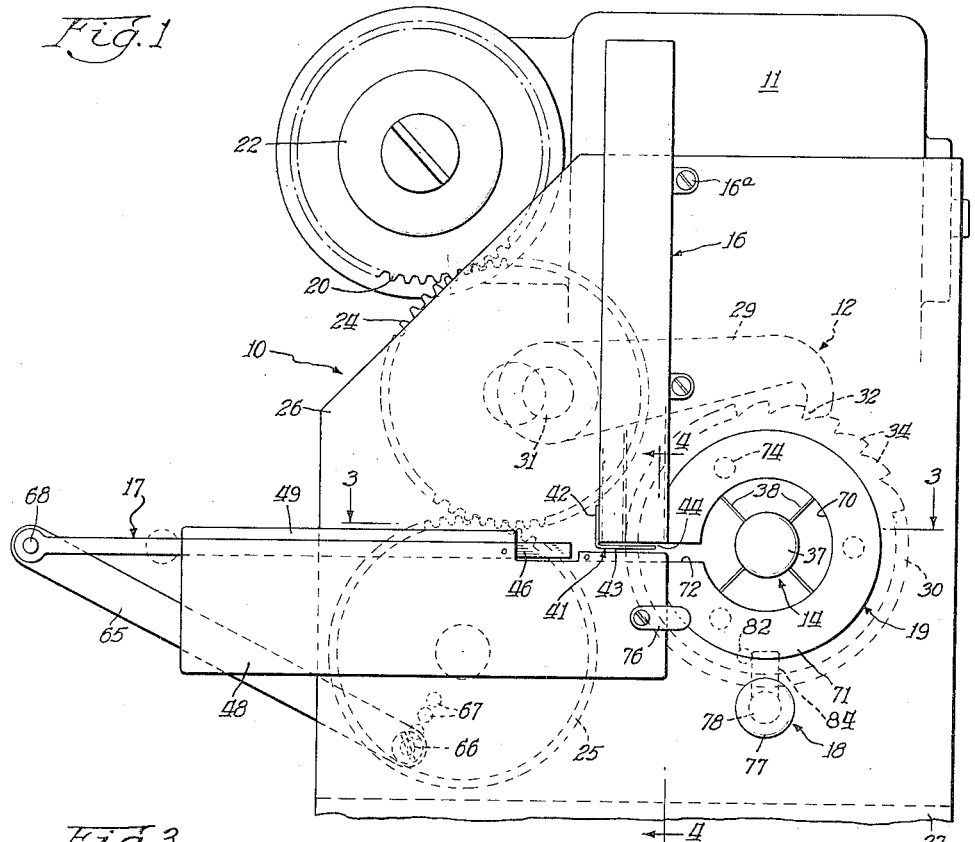
Fig. 1 is a side elevational view of a commutator assembly device according to the present invention.

In Figs. 1 and 2 is shown a commutator assembly device generally designated by the reference numeral 10 and comprising drive means 11 such as a speed reduction electric motor, indexing mechanism 12, segment receiving structure such as a spool or hub 14, segment supply means such as the segment chutes 15 and 16, segment feed mechanism 17, stop and start means 18, and ejector mechanism 19.

The motor 11 is arranged for driving a gear 20 through a coupling 21 and a slip clutch 22 of any suitable design. The slip clutch 22 is aranged to drive the gear 20 when ordinary loads are applied thereto, but the clutch will slip and permit the gear 20 to stop when an abnormal load is encountered. A gear 24 is in mesh with the gear 20 and another gear 25 is in mesh with gear 24. The gears 24 and 25 are rotatably secured to a vertical support plate 26 which is fixedly secured to a base plate 27, and the motor 11 is supported on a pedestal 28 which is fixedly secured to the base plate 27. The base plate 27 may be rested on a bench or any other suitable support.

The indexing mechanism 12 may comprise a pawl 29 and a ratchet gear 30. One end portion of the pawl 29 is pivotally secured at 31 to one side of the gear 24 eccentrically of the gear axis, as shown. At its opposite end, the pawl 29 is provided with a ratchet lug 32 which is adapted for successively engaging a plurality of ratchet teeth 34 formed about the periphery of the ratchet gear 30. It will be readily seen that the indexing mechanism 12 operates to rotate the gear 30 a peripheral distance equal to the circumferential length of one of the teeth 34 upon each complete rotation of the gear 24. Upon the completion of one rotation of gear 24, the ratchet lug 32 has moved into engaging position with the next successive ratchet tooth 34 preparatory to indexing the gear 30 another tooth length upon another complete rotation of the gear 24.

The segment receiving structure 14 is formed as a hub on the ratchet gear 30 and, consequently, is indexed in accordance with the operation of the indexing mechanism 12. The hub 14 serves to rotatably support the gear 30 from the support plate 26 by means of a stepped journal portion 35 formed on the hub which is journalled in a conforming counterbored aperture 36 formed in the plate. A reduced diameter portion 37 of the hub 14 extends outwardly from the side of the plate 26 opposite from the gear 30 and is provided with a plurality of longitudinally secured, radialy extending fins 38, herein shown as four in number, formed of very thin sheet metal or the like and which aid in assembly of the commutator by providing a temporary support for the segments.

The supply chute 15, which may be formed of sheet metal or the like, is arranged for continuously supplying electrical conducting segments to the segment feed mechanism 17. A typical electrical conducting copper segment 39 is illustrated in Fig. 6. The copper segments 39 may be fed into the chute 15 by means of a rotary hopper or the like (not shown) to travel in the chute by gravity to the segment feed mechanism 17. The supply chute 16 is utilized for supplying segments of insulating material, such as a mica segment 40 shown in Fig. 7, to the segment feed mechanism. The chute 16 may be formed of sheet metal or the like and is fixedly secured in vertical relation to the support plate 26 by means of screws 16a so that the mica segments 40 will travel downwardly by gravity to the feed mechanism 17 as the assembly device 10 is operated.

Figure 3:
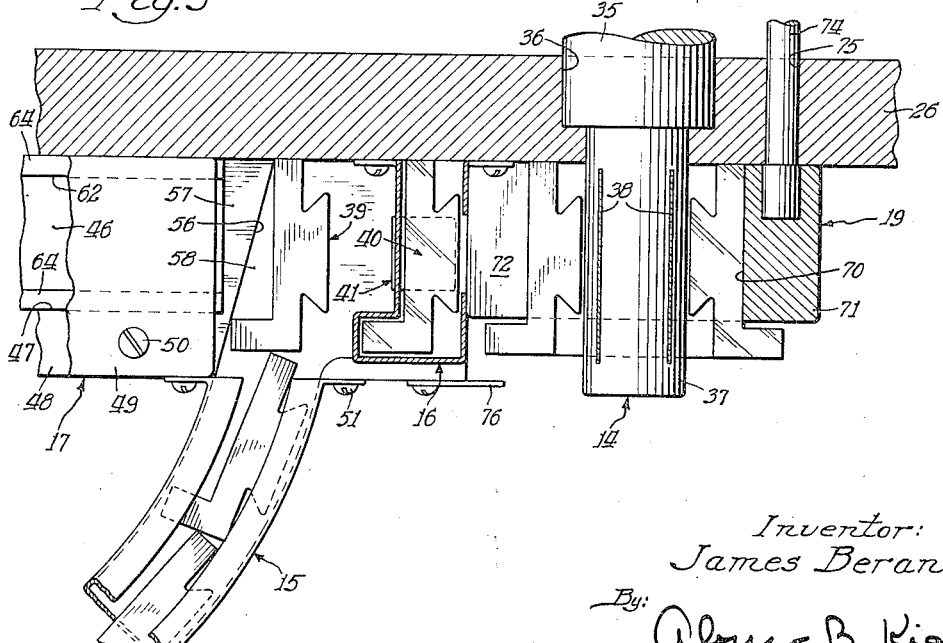
Fig. 3 is an enlarged fragmentary sectional view taken along 3—3 of Fig. 1 and showing the slide and assembly mechanism.

A retaining member such as a sheet metal clip or support 41 of L-shaped configuration has a vertical leg portion 42 fixedly secured to the chute 16 outwardly thereof and a horizontal leg or finger portion 43 extending to the right as shown in Figs. 1 and 3 and slightly below the bottom edge of the chute to provide a temporary support for the insulating segments and at the same time to permit the lowest segment to be moved to the right during each assembly stroke. A narrow gap 44 is provided between the upwardly facing surface of the leg 43 and the bottom edge of the chute 16, this gap being slightly greater than the thickness of one of the mica segments 40 and narrower than the combined thickness of two of the segments 40. Thus, single mica segments 40 can be successively fed to the right as seen in Figs. 1 and 3 from the bottom of the stack of mica segments in the chute 16. It will be seen that it is impossible to withdraw more than one mica segment at a time from the bottom of the stack because of the size of the gap 44 which causes the next succeeding segment in the stack to be restrained by the bottom edge portion of the chute 16 as the bottom segment is slid out.

The commutator assembly device of this invention is intended to assemble the conducting and insulating segments of a commutator for an electric motor or the like into a generaly cylindrical form as illustrated by a commutator 45 shown in Fig. 5. It will be noted that the conducting segments 39 are wedge or bevel shaped as shown in Fig. 6, so that the assembled segments readily form the cylindrical commutator 45. When a commutator has been so assembled, it is ready for assembling with a commutator hub (not shown) to hold the alternate segments in their assembled relation, a further operation not within the scope of this invention.

The segment feed mechanism 17 includes a reciprocable member or slide 46 which is slidably disposed in a longitudinal groove 47 formed in a slide support and feed block 48. The block 48 is fixedly secured horizontally to the side of the plate 26 opposite to the gearing. The slide 46 is retained for reciprocation within the groove 47 by means of a top retainer plate 49 which is fixedly secured to the block 48 by means of screws 50. The chute 15 has its discharge end portion secured to the slide support block 48 by means of screws 51 in such a manner that the copper segments 39 will slide down the chute 15 by gravity and onto the top surface of the block 48 as seen in Fig. 3.

Ordinarily, segments such as 39 and 40 are formed with elongated body portions 52 and 53 and perpendicularly extending tab portions 54 and 55. Therefore, a shallow diagonal step 56 is formed on the top surface of the block 48 so that a surface 57 on which the slide 46 rests is slightly higher than a surface 58 on which the copper segments 39 slide. The purpose of this step is to guide the segments 39 successively into generally perpendicular relation to the slide 46 as seen in Fig. 3.

The width of the slide 46 is slightly less than the length of a straight longitudinal edge 60 of each of the segments 39 and a straight longitudinal edge 61 of each of the segments 40. A shallow longitudinal groove 62 is formed in the upper surface of the slide 46 in such a manner that as the slide moves to the right as seen in Figs. 1 and 3, the end of the slide will first engage the edge 60 of the segment 39 on the surface 58, but the slide will subsequently clear the clip 41. The end of two opposite longitudinal flanges 64 defining the groove 62 will engage the edge 61 of the bottom mica segment 40 contained in the chute 16 as the slide continues to move toward the right from the position where it contacts the segment 39. As will be seen, the top surfaces of the flanges 64 just clear the bottom edge of the chute 16. Thus, as the slide 46 moves to the right as seen in Figs. 1 and 3, it will first engage the edge 60 of a copper segment 39 to move the segment 39 to the right until it is directly under the bottom segment 40 in the chutee 16, and then the ends of flanges 64 of the slide will engage the edge 61 of this bottom segment so that a stack consisting of one copper segment and one mica segment will be moved to the segment receiving hub 40.

The segment feed mechanism includes a feed drive link 65 which is pivotally secured to one side of the gear 25 at a point 66 located eccentrically from the axis of the gear. Means are provided for adjusting the throw of the link, and in the present instance such means may comprise a plurality of radially aligned attachment holes 67. The other end portion of the link 65 may be pivotally secured in any suitable manner to the rearward end portion of the slide 46, and herein the attachment means comprise a strut 68. By reference to Fig. 1, it will clearly be seen that the link 65 translates rotary motion of the gear 25 into reciprocatory movement of the slide 46.

The gears 24 and 25 are of the same size so that one cycle of reciprocation of the slide 46 will coincide with one ratchet cycle of the indexing mechanism 12. The circumferential lengths of the ratchet teeth 34 are such that the hub 14 is indexed a distance equal to the combined thickness of one copper segment and one mica segment, and the indexing mechanism and the feed mechanism are so arranged that the feeding and indexing operations occur alternately. For instance, if the motor 11 rotates the gear 20 so that the gear 25 will rotate in a clockwise direction as indicated in Fig. 1, the ratchet gear 30 will be rotated into its next indexed position while the slide 46 is being retracted, and the gear 30 will be stationary with the pawl lug 32 moving into position to engage another ratchet tooth as the slide moves forward to feed another pair of segments to the segment receiving hub 14.

The pairs of segments which are successively fed against the segment receiving hub 14 are held within a cylindrical segment assembly cavity 70 formed in an ejector ring 71 which is part of the ejector mechanism 19. As will be seen in Fig. 1, the hub portion 37 and the fins 38 rotate within the cavity 70 to index the segments in a counterclockwise direction as the respective pairs are successively fed to the hub. The fins 38 serve to prevent segments which have been fed into the cavity from sliding back in a clockwise direction after a sufficient number have been fed thereinto, and further, the fins retain the first segment in radially extending position. The ejector ring 71 has an inlet slot 72 formed substantially radially therethrough to allow the feeding of the successive stacks of segments into the cavity 70 against the hub 14.

A plurality of pilot pins 74, herein shown as three, are fixedly secured to the ring 71 and extend parallel to the axis of the ring through apertures 75 formed through the plate 26. The pilot pins 74 permit partial ejection of a completed commutator by movement of the ring 71 to the left as shown in Fig. 2, to move the completed commutator outwardly with the ring by means of the respective flanges 54 and 55 of the segments 39 and 40. A limit tab 76 is fixedly secured to the block 48 to limit the outward movement of the ejector ring 71. When this outward position of the ring 71 has been reached, the ring is moved back into position against the plate 26 and the assembled commutator will remain in the extended position due to friction between the segments and the fins 38 and the hub 37. The assembled commutator can then be completely removed from the cavity 70 after being provided with some means to prevent the distarrangement of the segments, such as by slipping a rubberband or the like about the periphery of the commutator.

The stop and start means 18 may comprise a button 77 secured to one end portion of a rod 78 which is slidably retained in a hole 79 formed through the plate 26. A shoulder 80 is formed on the rod 78 to prevent movement of the rod beyond the shoulder to the left and shown in Fig. 2. A compression spring 81 is disposed between the button 77 and the opposed face of the plate 26 to normally hold the rod 78 in the position shown in Fig. 2 but permitting yieldable movement of the rod to the right. A stop pin 82 is fixedly secured to the opposite end portion of the rod 78 and a stop lug 84 is fixedly secured to one side of the ratchet gear 30 near the outer periphery thereof in position for engaging the pin 82. With the stop pin 82 and the stop lug 84 abutting as shown in Figs. 1 and 2, the gears will be held from rotation even though the motor 11 is in operation due to slipping of the clutch 22. In order to start the machine into operation for a complete assembly cycle, the button 77 is moved to the right as seen in Fig. 2 until the stop pin 82 clears the stop lug 84 whereupon the gears begin to rotate to perform the above described feeding and indexing operations. The button 77 is released after the mechanism has started to operate and when a complete commutator has been assembled, the gear 30 and the stop lug 84 will have made one complete rotation so that the stop lug will again abut the stop pin 82 causing the clutch 22 to slip.

Briefly summarizing the operation of the commutator assembly device 10, with the motor 11 operating the start button 77 is depressed to begin the cycle. The clutch 22 immediately takes hold and the feed mechanism 17 operates to first engage one copper segment 39 which has slid by gravity into the initial position shown in Fig. 3. As the slide 46 moves under the bottom edge of the mica chute 16, the flanges 64 engage the bottom mica segment in the stack contained in the chute, and a stack consisting of a copper segment below and a mica segment above is slide through the slot 72 into the cavity 70 against the hub 14. Then the slide 46 begins to retract and the indexing mechanism 12 moves the gear 30 in a counterclockwise direction as seen in Fig. 1 the length of one ratchet tooth 34 by means of the pawl 29. When the slide 46 has been retracted sufficiently, another mica segment and another copper segment move into positions for engagement by the slide upon its next movement forward. This sequence of operation continues until the ratchet gear 30 has made a complete revolution so that the stop lug 84 again contacts the stop pin 82 and so that the clutch 22 slips and the feeding and indexing operations cease.

The assembled commutator is ejected by pulling the ring 71 outwardly to the limit lug 76, and then the ring is again moved against the plate 26 leaving the commutator extending partially out of the cavity 70. This commutator is then manually removed from the machine after a rubberband or the like has been disposed about its periphery to temporarily retain the segments in assembled relation. The assembly device is now in condition for performing another assembling cycle initiated by depressing the start button 77.

It will be seen that the various elements of commutator assembly device 10 can be varied in size in order to handle any sizes of segments to form any size of commutator. Auxiliary supply means (not shown) can be attached to the supply chutes 15 and 16 so that the assembling operation can proceed substantially continuously with practically no lost time. If desired, a rheostat or other control means (not shown) can be utilized with the motor 11 to change the speed of operation of the assembly device to suit the size of commutator being assembled.

From the above description, it will be readily understood that the present invention provides a very simple and inexpensible assembly device for quickly and efficiently assembling the alternate conducting and insulating segments of commutators for electric motors, generators and the like. Simplified and positive acting means are utilized for successively feeding stacked pairs of segments to segment receiving structure which is indexed in timed relation with the operation of the feed mechanism. Positive stop means are included to stop the operation of the assembly mechanism upon the completion of each successive commutator, and ejector means are provided for easily removing assembled commutators from the machine. Gavity feed chutes are included to provide substantially continuous supplies of conducting and insulating segments positioned for engagement by the feed mechanism.

It will be understood that modifications and variations may be effected without departing from the scope of the novel concepts of the present invention.

I claim:

In a device for assembling a commutator having alternate segments of electrical insulating material and electrical conducting material, power means, segment receiving structure having a cylindrical segment receiving cavity therein and a generally radially extending segment inlet slot, a rotatable hub located in axial spaced relation in said cavity with the space between the hub and the structure being sufficient to receive said segments longitudinally in radially disposed relation about the hub, longitudinally secured radially disposed fins on said hub for supporting the segments within said cavity as the hub is rotated, indexing mechanism driven by said power means and associated with said hub for intermittently rotating the same in a plurality of equal intervals, a slide support block having longitudinal groove therein, a slide reciprocably mounted in said groove and movable between retracted and extended positions, said slide having a body portion with flanges formed on the top surface of said body portion at one end portion thereof, a chute for successively supplying conducting segments to a feeding position on said block in front of said slide when in its retracted position, a second chute disposed substantially vertically and adapted for containing a plurality of insulating segments in stacked relation with the bottom insulating segment in a feeding position above said block and in front of said slide when in its retracted position, a retaining member secured to the bottom end portion of said second chute and having a retaining finger extending substantially horizontally below the bottom of the second chute, the vertical distance between said second chute and said finger being less than the combined thickness of two insulating segments but more than the thickness of one insulating segment so that said finger supports the stacked segments in said chute with the bottom segment in said feeding position for discharge between said chute and said finger, an eccentric throw mechanism driven by said power driven means and associated with said slide for reciprocating the slide in timed relation with the intervals of rotation of said hub, whereby when said slide is moved towards its extended position said body portion engages said conducting segment in feeding position and said flanges engage said insulating segment in feeding position to form a stack of the two segments with the conducting segment on the bottom, and whereby when said slide reaches said extended position said stack of segments is disposed in said cavity, and means guiding at least part of said segment receiving structure for bodily longitudinal movement to effect ejection of an assembly of segments.

References Cited in the file of this patent

UNITED STATES PATENTS

| | | |
|---|---|---|
| 1,343,351 | Collins | June 15, 1920 |
| 1,493,480 | De Tour | May 13, 1924 |
| 1,759,500 | Frederick | May 20, 1930 |
| 1,759,501 | Frederick | May 20, 1930 |
| 1,899,325 | Hardiman et al. | Feb. 28, 1933 |
| 1,979,434 | Baker et al. | Nov. 6, 1934 |
| 2,394,955 | Weber | Feb. 12, 1946 |
| 2,476,641 | Van Winkle | July 19, 1949 |
| 2,507,186 | Schneider | May 9, 1950 |
| 2,601,570 | Suthers | June 24, 1952 |